Feb. 26, 1935.　　　C. J. ANDERSON, JR　　　1,992,457
POWER TRANSMISSION
Filed Sept. 3, 1932　　　3 Sheets-Sheet 1
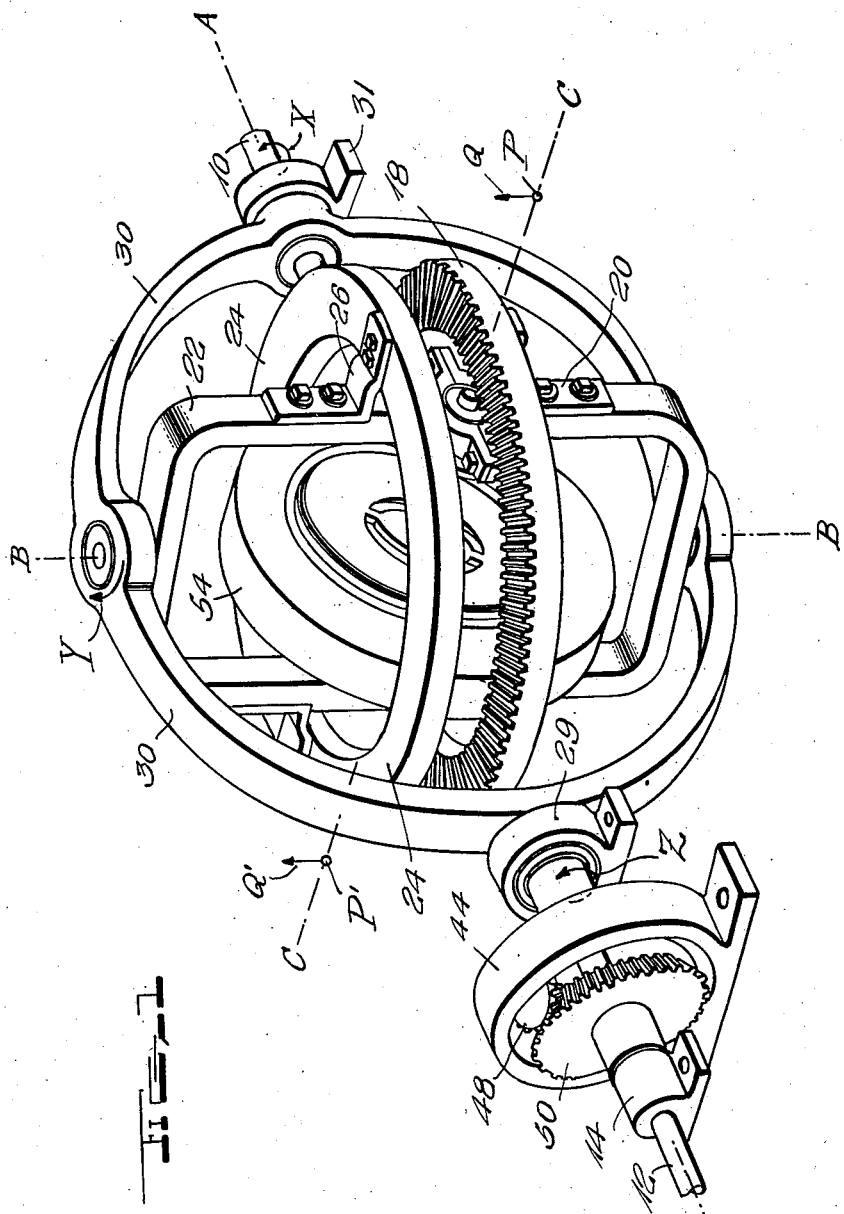
INVENTOR.
CHARLES J. ANDERSON JR.
BY Ralph L. Truesdale
ATTORNEY.

Feb. 26, 1935. C. J. ANDERSON, JR 1,992,457
POWER TRANSMISSION
Filed Sept. 3, 1932 3 Sheets-Sheet 2
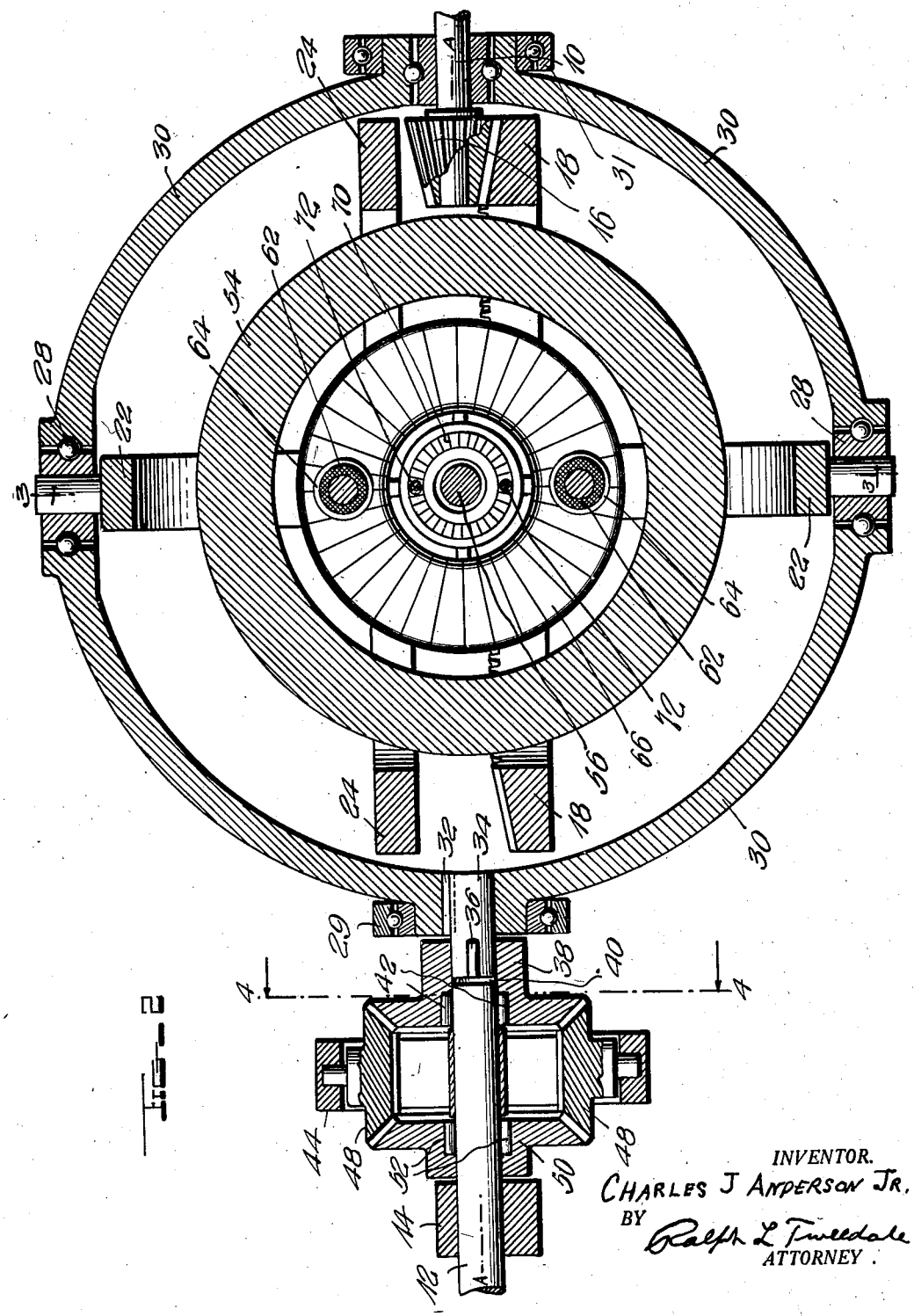
INVENTOR.
CHARLES J ANDERSON JR.
BY
Ralph L. Tweedale
ATTORNEY.

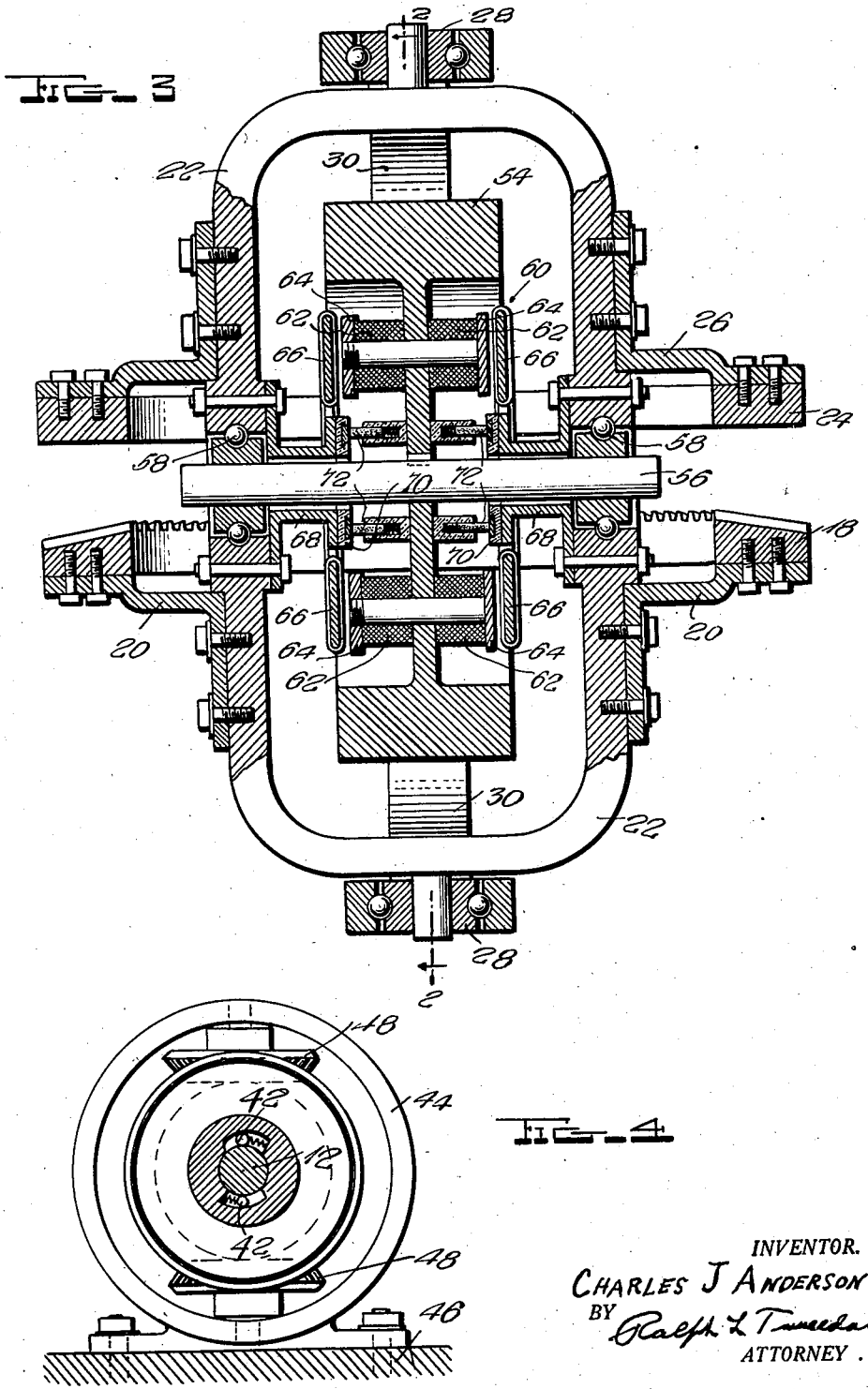

Patented Feb. 26, 1935

1,992,457

UNITED STATES PATENT OFFICE 1,992,457

POWER TRANSMISSION

Charles J. Anderson, Jr., Jamestown, N. Y.

Application September 3, 1932, Serial No. 631,668

9 Claims. (Cl. 74—5)

This invention relates to torque converters of the type in which the precessional forces set up in a gyroscope are utilized to produce a resultant torque on a driven shaft. The objects of this invention are:

(1) To provide a torque converter in which a spinning gyroscope is given a unidirectional input precession motion and which will produce a unidirectional resultant torque on an ultimately driven member varying within a wide range of values according to the resisting load on the ultimately driven member.

(2) To provide a torque converter in which a spinning gyroscope is given a unidirectional input precession movement and in which the resultant output precession movements of the gyroscope take place about the axis of the ultimately driven member.

(3) To provide a gyroscopic torque converter in which all parts are in static balance at all times.

(4) To provide a gyroscopic torque converter in which the ultimately driven shaft is coaxial with the driving shaft.

(5) To provide a gyroscopic torque converter in which the average resultant torque on the ultimately driven shaft is a direct function of the speed of the driving shaft, and (6) To provide a gyroscopic torque converter of simple and rugged design having few parts and suitable for operation over a wide range of variation of the torque and speed of the driving and driven members respectively.

A preferred embodiment of the invention is illustrated in the accompanying drawings forming a part of this specification in which:—

Figure 1 is an isometric view of the torque converter.

Figure 2 is a longitudinal cross section of the torque converter taken on line 2—2 of Figure 3.

Figure 3 is a transverse cross section taken on line 3—3 of Figure 2, and

Figure 4 is a detail view of a rotation rectifying device forming a part of the torque converter.

In the embodiment illustrated in the drawings, 10 represents a driving shaft which may be driven from any suitable source of power, for example, an internal combustion engine or a synchronous alternating current motor, these being merely typical of the various prime movers for which this torque converter is suitable. An ultimately driven shaft 12 rotates in a journal bearing 14 and is located coaxially with driving shaft 10 and on the opposite side of the mechanism of the torque converter. Rigidly secured to the shaft 10 is a bevel pinion 16 which meshes with a ring gear 18. The ring gear 18 is secured by means of brackets 20 to a gyroscope carriage member 22. The ring gear 18 is located slightly to one side of the axis A about which the shafts 10 and 12 rotate which throws the system so far described out of static balance. In order to offset this effect a counter-balancing means is provided which may consist of a balancing ring 24 having a mass distribution similar to that of the ring gear 18 and secured to the carriage member 22 by means of brackets 26. The balancing ring 24 is symmetrically located on the opposite side of axis A with respect to the ring gear 18. The carriage member 22 is pivoted in ball bearings 28 located in a yoke 30 for rotation about an axis B. The yoke 30 is rotatably mounted in ball bearings 29 and 31 for rotation about an axis A.

Within the carriage member 22 a gyroscope wheel 54 is mounted rigidly on a shaft 56 which rotates on ball bearings 58 about axis C. The gyroscope wheel 54 is adapted to be given continuous rotation by a spinning means such as an electric motor 60 having field coils 62 surrounded by pole pieces 64 carried on the gyroscope wheel 54. Armature members 66 are fixed to the carriage member 22 by spool shaped armature supports 68 rigidly bolted to carriage member 22. Commutator discs 70 are carried by the armature supports 68 and are traversed by brushes 72 which are resiliently carried by the wheel 54. Electric current is fed to the motor through electric connections, not shown, which may preferably include slip rings and brushes located on axis A and axis B. The structural details of the electric motor need not be as shown but may be considerably varied from the present disclosure, it merely being necessary that some means be provided for imparting to the wheel 54 a continuous rotation. Obviously other than electric motors may also be suitable for this purpose.

A stub shaft 34 is secured to yoke 30 by a key 32 and there is rigidly secured to stub shaft 34 by key 36 a bevel gear 38. The bevel gear 38 has a bore 40 into which the stub shaft 34 extends but part way. The remaining portion of the bore 40 is occupied by the ultimately driven shaft 12. A roller clutch 42 permits the bevel gear 38 to drive shaft 12 in the forward direction but is adapted to ride freely around shaft 12 when gear 38 turns in a reverse direction. A ring 44 is rigidly mounted on a portion of a frame indicated in Figure 4 at 46 and carries for free rotation therein a pair of bevel gears 48. The bevel gears 48 mesh with bevel gear 38 and also with a bevel gear 50 freely rotatable on shaft 12. It will be seen that the rotation of gear 38 in one direction will drive gear 48 in the opposite direction through the medium of bevel gears 48 since the latter are restrained from turning about axis A by the ring 44. Within the bevel gear 50 is located a roller clutch 52 similar to the roller clutch 42 and adapted to drive shaft 12 in the forward direction when gear 50 rotates forwardly and to ride free around shaft 12 when gear 50 rotates in a reverse direction. The mechanism just described constitutes a rotation rectifying device which will translate oscillatory rotation of stub shaft 34 into a continuous unidirectional rotation of shaft 12.

In describing the operation of the device, the axis A may be called the axis of output precession, the axis B may be called the axis of input precession and the axis C may be called the spin axis. In the operation of the device, current is supplied to the electric motor 60 and the wheel 54 is thus brought up to a speed of rotation about axis C in a clockwise direction when viewed from point P which for the purpose of the present discussion will be assumed to be constant since there is no load on the wheel 54 except friction of the ball bearings 58, the friction of the brushes 72 rubbing on the commutator discs 70 and air friction. If then the drive shaft 10 is rotated unidirectionally there will be imparted to the carriage member 22 a unidirectional rotation about axis B. According to the well-known law of the gyroscope this rotation which may be called "input precession" produces a resultant alternating rotation or oscillation of the yoke 30 about axis A, this resultant rotation being spoken of herein as "output precession." As the rotation of shaft 10 is in the direction of arrow X of Figure 1 this will impart to the carriage 22 an input precession in the direction of the arrow Y. If a point P be considered on axis C at an instant when the parts are in the position shown in Figure 1 it will be seen that the input precessional motion of carriage 22 will produce a resultant output torque on yoke 30 which will tend to move point P in a direction of the arrow Q. In other words, the output precessional torque about axis A will be in the direction of the arrow Z. If now, we consider point P at an instant when carriage member 22 has completed 180° of further rotation in the direction of arrow Y it will be in the position P¹. The resultant output precessional torque will still be upwardly as shown by the arrow Q¹ since the direction of spin of wheel 54 is unchanged as is also the direction of input precession of carriage 22. Since the point P is now on the opposite side of axis A the resulting output precessional torque on yoke 30 will be in a direction opposite to that of the arrow Z. It will be thus seen that the output torque on yoke 30 will vary from a maximum in one direction when axis C is perpendicular to axis A down to zero when axis C is coincident with axis A then up to a maximum in the opposite direction when axis C is again perpendicular to axis A then down to zero and up to maximum in the first direction again during a single revolution of carriage 22. This results in an oscillating output torque being produced about axis A. This oscillating torque is converted into a unidirectional torque on shaft 12 through the rotation rectifying device previously described.

If the load connected to the shaft 12 is less than the average resulting output precessional torque the shaft 12 will rotate under each torque impulse and the yoke 30 will take up an oscillatory motion about axis A. As the speed of shaft 12 increases and therewith the oscillatory speed of yoke 30 the speed of rotation of carriage member 22 will be somewhat varied due to relative rotation of yoke 30 and shaft 10. When yoke 30 is rotating in the same direction as shaft 10 the relative speeds will be reduced and the input precessional movement of carriage member 22 will be slower than what it would be were yoke 30 standing still. On the other hand, when yoke 30 is rotating oppositely to shaft 10 the relative speeds will be increased and the input precessional movement of carriage member 22 will be correspondingly increased. As the speed of yoke 30 in a forward direction approaches the speed of shaft 10 the input precessional movement of carriage member 22 during this phase will become steadily slower. This results in the forward movements of yoke 30 and the corresponding input precessional movements of carriage member 22 becoming steadily longer each cycle of operation, while, at the same time the reverse movements of yoke 30 with the corresponding input precessional movements of carriage member 22 become increasingly quicker. This effect continues to become more pronounced until a state of operation is reached where the forward cycle of output precessional movement of yoke 30 takes an infinite time for completion and the reverse output precessional movements of yoke 30 disappear. In other words, the device becomes a "locked unit" and drive is effected through the tendency of the gyroscopic wheel to maintain its axis in a fixed position. As long as the load on shaft 12 is appreciable it will be impossible for the gyroscope wheel 54 to maintain its axis C fixed, that is, coincident with axis A; but the axis C will be forced to describe a conical surface having its axis along axis A.

It will be seen that this invention provides a mechanism which will convert a constant or varying rotation of a driving shaft into a unidirectional rotation of a driven shaft and exerts on the driven shaft a torque which is independent of the torque on the driving shaft. Also the driven shaft may rotate at any speed less than or equal to that of the driving shaft; the essential relation of the torque and speeds of the two shafts being merely that the product of the average torque and speed of the one shaft bears a constant relation to the product of the average torque and speed of the other shaft. In other words, the power transmitted to the driven shaft is practically equal to the power transmitted by the driving shaft. These relations make the device very advantageous for use where the prime mover is capable of operation at high efficiency over a limited range of speeds and where it is necessary that the output power be transmitted at low speed and high torque. For situations of this character the present invention is especially adapted, since it produces the equivalent of a gear having an infinitely variable ratio and operating at very high efficiency.

I claim:

1. A gyroscopic torque converter including in combination, a unidirectionally rotating driving shaft, a unidirectionally rotating driven shaft, a gyroscopic mass, means for mounting said mass for simultaneous rotation about three mutually perpendicular axes, namely, a spinning axis, an input precession axis, and an output precession axis, means for imparting rotation to the mass about the spinning axis, gearing for transmitting continuous rotation from the driving shaft to the mass about the input precession axis and means for converting the alternating rotation of the mass and portion of the mounting means about the output precession axis into a continuous unidirectional rotation of the driven shaft.

2. A gyroscopic torque converter including in combination, a gyroscopic mass, means for mounting the mass for simultaneous rotation about three mutually perpendicular axes, namely, a spinning axis, an input precession axis, and an output precession axis, means for imparting rotation to the mass about the spinning axis, a rigid shaft and gearing for imparting continuous rotation to the mass about the input precession axis, means for receiving torque impulses of the mass about the output precession axis, and means for keeping the system in static balance.

3. A gyroscopic torque converter including in combination, a unitary gyroscope mass having means for rotating it about a spin axis, means for mounting the mass for rotation about an input precession axis substantially normal to and intersecting the spin axis and also about an output precession axis substantially normal to and intersecting both the spin axis and the input precession axis, an input member mounted for definitely constrained motion, an output member also mounted for definitely constrained motion, means associated with the input member for causing unidirectional rotation of the gyroscope mass and portions of the mounting means about the input precession axis and means for converting the resultant oscillating motion of the gyroscope about the output precessional axis into unidirectional rotation of the output member.

4. A gyroscopic torque converter including in combination, a unitary gyroscope mass having means for rotating it about a spin axis, means for mounting the mass for rotation about an input precession axis substantially normal to and intersecting the spin axis and also about an output precession axis substantially normal to and intersecting both the spin axis and the input precession axis, an input member mounted for definitely constrained motion, an output member also mounted for definitely constrained motion, means associated with the input member for causing unidirectional rotation of the gyroscope mass and portions of the mounting means about the input precession axis and means for converting the resultant oscillating motion of the gyroscope mass and portions of the mounting means about the output precessional axis into unidirectional rotation of the output member, the input member being coaxial with the output member.

5. In a gyroscope torque converter the combination of a first gyroscope carriage member journaled for rotation about a first precession axis, a second gyroscope carriage member journaled for rotation about a second precession axis substantially normal to the first precession axis and carrying the first carriage member, a ring gear mounted on the first member having its center of curvature in the first precession axis and spaced from the second precession axis and a balancing member similar in mass distribution to the ring gear mounted on the first member having its center of curvature in the first precession axis and spaced from the second precession axis but on the opposite side thereof from the ring gear.

6. In a gyroscope torque converter the combination of a first gyroscope carriage member journaled for rotation about a first precession axis, a second gyroscope carriage member journaled for rotation about a second precession axis substantially normal to the first precession axis and carrying the first carriage member, a ring gear mounted on the first member having its center of curvature in the first precession axis and a balancing member similar in mass distribution to the ring gear mounted on the first member having its center of curvature in the first precession axis, the ring gear and the balancing member being located symmetrically about the second precession axis.

7. A gyroscopic torque converter including in combination a unidirectionally rotating driving shaft, a unidirectionally rotating driven shaft, a gyroscopic mass, means mounting the mass for simultaneous rotation about three mutually perpendicular axes, namely, a spinning axis, an input precession axis and an output precession axis, means for imparting rotation to the mass about the spinning axis, means for transforming rotation of the driving shaft into rotation of the mass and portions of the mounting means about the input precession axis, and means for transforming the resultant alternating rotation of the mass and portions of the mounting means about the output precession axis into unidirectional rotation of the driven shaft, said last named means acting to transmit substantially undiminished both forward and reverse torque impulses of the mass about the output precession axis.

8. A gyroscopic torque converter including in combination a unidirectionally rotating driving shaft, a unidirectionally rotating driven shaft coaxial therewith, a gyroscopic mass, means mounting the mass for simultaneous rotation about three mutually perpendicular axes, namely, a spinning axis, an input precession axis and an output precession axis, means for imparting rotation to the mass about the spinning axis, means for transforming rotation of the driving shaft into unidirectional rotation of the mass and portions of the mounting means about the input precession axis, and means for transforming the resultant alternating rotation of the mass about the output precession axis into unidirectional rotation of the driven shaft, said last named means acting to transmit substantially undiminished both forward and reverse torque impulses of the mass about the output precession axis.

9. A gyroscopic torque converter including in combination a unidirectionally rotating driving shaft, a unidirectionally rotating driven shaft, a gyroscopic mass, means mounting the mass for simultaneous rotation about three mutually perpendicular axes, namely, a spinning axis, an input precession axis and an output precession axis which is also the axis of the driven shaft, means for imparting rotation to the mass about the spinning axis, means for transforming rotation of the driving shaft into rotation of the mass and portions of the mounting means about the input precession axis, and means for transforming the resultant alternating rotation of the mass about the output precession axis into unidirectional rotation of the driven shaft, said last named means acting to transmit substantially undiminished both forward and reverse torque impulses of the mass about the output precession axis.

CHARLES J. ANDERSON, Jr.